US007204020B2

(12) United States Patent
Morris et al.

(10) Patent No.: US 7,204,020 B2
(45) Date of Patent: Apr. 17, 2007

(54) METHOD FOR FABRICATING A CHARGE PLATE FOR AN INKJET PRINTHEAD

(75) Inventors: Brian G. Morris, Dayton, OH (US); Richard W. Sexton, Bainbridge, OH (US); Michael F. Baumer, Dayton, OH (US); James E. Harrison, Jr., Dayton, OH (US)

(73) Assignee: Eastman Kodak Company, Rochester, NY (US)

( * ) Notice: Subject to any disclaimer, the term of this patent is extended or adjusted under 35 U.S.C. 154(b) by 197 days.

(21) Appl. No.: 10/966,236

(22) Filed: Oct. 15, 2004

(65) Prior Publication Data

US 2006/0082613 A1 Apr. 20, 2006

(51) Int. Cl.
*B21D 53/76* (2006.01)
*G01D 15/00* (2006.01)

(52) U.S. Cl. ......................... 29/890.1; 29/594; 29/831; 29/846; 29/847; 216/27

(58) Field of Classification Search ............... 29/890.1, 29/846, 847, 831, 594; 347/45, 75, 90; 310/335, 310/336, 363, 800; 219/121.69, 121.68, 219/121.71; 216/27; 427/96.1, 123, 100, 427/126.6

See application file for complete search history.

(56) References Cited

U.S. PATENT DOCUMENTS

| | | | | |
|---|---|---|---|---|
| 4,101,906 | A | 7/1978 | Dahlstrom et al. | |
| 4,568,946 | A | 2/1986 | Weinberg | |
| 5,010,641 | A * | 4/1991 | Sisler | 29/830 |
| 5,481,285 | A * | 1/1996 | Pies et al. | 347/45 |
| 5,512,117 | A * | 4/1996 | Morris | 216/20 |
| 6,249,076 | B1 * | 6/2001 | Madden et al. | 310/363 |
| 6,274,057 | B1 | 8/2001 | Sexton et al. | |
| 6,478,413 | B1 | 11/2002 | Motegi et al. | |
| 6,543,885 | B2 | 4/2003 | Bahl et al. | |
| 6,625,857 | B2 * | 9/2003 | Appelt et al. | 29/25.42 |

FOREIGN PATENT DOCUMENTS

| | | |
|---|---|---|
| EP | 0104951 | 4/1984 |
| EP | 0744291 | 11/1996 |

* cited by examiner

*Primary Examiner*—A. Dexter Tugbang
*Assistant Examiner*—Tai Van Nguyen
(74) *Attorney, Agent, or Firm*—The Buskol Law Group, P.C.

(57) ABSTRACT

A method for fabricating a charge plate for an ink jet printhead entails removing portions of conductive material from a dimensionally stable dielectric substrate with a coating of conductive material to form at least a first and second electrode on a first face with a first space between the first and second electrodes, removing portions of conductive material from the dimensionally stable dielectric substrate with a coating of conductive material to form a first electrode extension that engages the first electrode on the conductive charging face, and a second electrode extension that engages the second electrode on the conductive charging face, whereby the first and second electrode extensions are electrically isolated from each other, additionally forming a first space between the electrode extensions, which connects with the first space between the electrode extensions.

30 Claims, 3 Drawing Sheets

METHOD FOR FABRICATING A CHARGE PLATE FOR AN INKJET PRINTHEAD

FIELD OF THE INVENTION

The present embodiments relate to a method for making a charge plate for use on ink jet printheads having drop generators, orifice plates, and charge plates.

The present embodiments relate to the charge plates used in ink jet printheads that comprise of drop generators, orifice plates forming a jet array, and a charge plate disposed opposite the charge plate.

BACKGROUND OF THE INVENTION

Current charge plate fabrication techniques are limited in the number of lines and spaces that can fit in a linear dimension. For example, current charge plates are typically made with 300-lines per inch resolution. Although higher resolutions can be achieved with these techniques, the higher resolutions come at great cost for development and eventual product yield is slower. A need has existed for a charge plate with a high resolution that can be made inexpensively.

Thin film structures for charge plates have the advantage of extremely high resolution (smaller line widths and spaces) and high yields. The disadvantage of fabricating a charge plate from a thin film processes is that the thin film technique has been unsuccessful in providing an electrode structure that extends to the edge and over the charging face of the charge plate.

The main difficulty in defining electrodes that continue from a top surface to an edge surface lies in the difficulty of photo imaging the pattern. Typically, spun liquid photoresist tends to “ball up” along an edge giving rise to thicker cross-sectional area. Since the amount of photo energy needed to expose properly the photoresist layer is dependent on the thickness of the photoresist layer, the balling up causes unacceptable results because consistency cannot be assured.

Another difficulty with thin film processes arises is attempting to expose a second surface after a first surface has already been exposed. Exposing the second surface has traditionally caused a detriment to the previously exposed material.

Other thin film techniques exist to from electrodes that “go around the edge.” For example, a shadow mask can be constructed out of wire or out of an L-shaped part with grooves and touch one side and edge to be patterned. After the shadow mask is constructed, sputtering or evaporation of the remaining side can be patterned and etched.

Accordingly, a need exists for a technique that creates extremely high resolution (smaller line widths and spaces) and high product yields in a cost effective manner.

The present embodiments described herein were designed to meet these needs.

SUMMARY OF THE INVENTION

The embodied methods are for fabricating a charge plate for an ink jet printhead. Initial portions of conductive material from a dimensionally stable dielectric substrate are removed. These initial portions are removed preferably using laser ablation to form a first electrode and a second electrode on a first conductive face of the substrate. In addition, a first space is created between the first electrode and second electrode. Additionally, portions of conductive material from the dimensionally stable dielectric substrate are removed from a second face of the substrate to form electrode extension of the first and second electrode. The first electrode extension engages the first electrode on the conductive charging face, and a second electrode extension engages the second electrode on the conductive charging face. The first and second electrode extensions are electrically isolated from each other. A space is formed between the electrode extensions wherein the first space connects with the first space between the electrode extensions forming a charge plate.

Embodied herein is charge plate formed by the embodied for fabricating a charge plate for an ink jet printhead.

BRIEF DESCRIPTION OF THE DRAWINGS

In the detailed description of the preferred embodiments presented below, reference is made to the accompanying drawings, in which.

Figure 1:
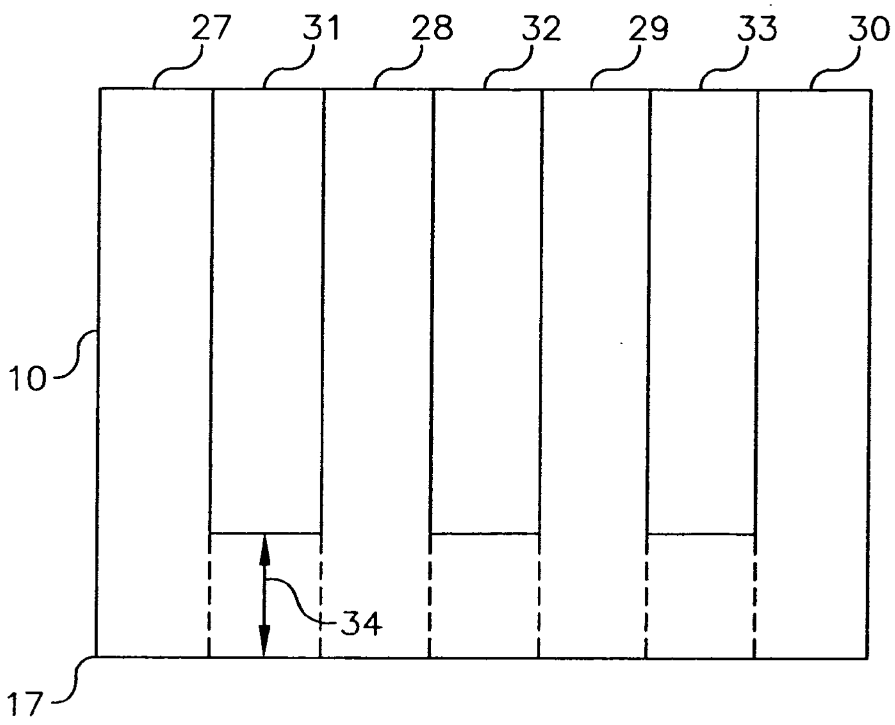
FIG. 1 depicts a top view of a substrate with four electrodes disposed on a first face.

The present embodiments are detailed below with reference to the listed Figures.

DETAILED DESCRIPTION OF THE INVENTION

Before explaining the present embodiments in detail, it is to be understood that the embodiments are not limited to the particular descriptions and that it can be practiced or carried out in various ways.

The embodied methods and charge plate are subject to fewer electrical shortings between electrodes as compared to current conventionally available charge plates. The methods provide techniques of manufacture with fewer open circuits on the electrodes, thereby increasing the reliability of the charge plate for use in an ink jet print head.

The method herein were designed to provide techniques of manufacture with fewer steps in order to produce usable charge plates that are more reliable than those formed by current methods. The charge plate is also more durable since electrical shorts will not easily pass through to the electrodes created on the face and charge face of the resulting charge plate.

The embodied methods permit a charge plate to be created with a sharp edge on the charge plate and electrodes that extend across the face and onto the charging face without gaps of currently commercialized techniques, thereby improving print head quality.

The embodied methods provide environmentally friendly manufacturing processes that do not require the use of large quantities of dangerous chemicals, which can poison the environment. The methods significantly create about half the chemical waste of current manufacturing methods, thereby reducing the amount waste that needs to be disposed of by makers of charge plates for ink jet print heads.

The methods of manufacturing charge plates as described herein are also safer for the employees of the manufacturing process since fewer flammable solvents are used in the process of laser ablation.

The embodied charge plates are more reliable than other systems since the resulting charge plates are less subject to degradation by inks because of the lack of gaps between the electrodes and the electrode extensions. For that same reason, the charge plates provide a higher resistance to erosive chemicals and can be made much thinner than current charge plates using the embodied methods.

The method for fabricating a charge plate 39 for an ink jet print head includes the step of forming a first and second electrode on a first face with a first space between the first electrode 27 and second electrode 28 on a non conductive dimensionally stable dielectric substrate 9.

One method of forming the electrodes on the first face 31 is by patterning a first photoresist layer on at least a first face 31 of the non conductive dimensionally stable dielectric substrate 9. The non conductive dimensionally stable dielectric substrate 9 is a thin rectangular shape slightly longer than a jet array for the ink jet print head. The substrate 9 typically is made from ceramic, glass, quartz, and composites thereof, and combinations thereof. A continuous conductive coating 26 is then added on one or more faces of the non conductive dimensionally stable dielectric substrate 9, between 1,000 Angstroms and 10,000 Angstroms, to encapsulate the substrate. The continuous conductive coating 26 is selected from the groups consisting of titanium, gold, platinum, palladium, silver, 30 nicked, tantalum, tungsten alloys thereof, and combinations thereof. Depositing the continuous conductive coating 26 is performed by chemical vapor deposition, evaporation, sputtering, electron beam evaporation, printing, electroless plating, thick film deposition, thin film deposition, and combinations thereof. Finally, the first photoresist layer is lifted off to form the electrode. Patterning is done by either photoresist or direct removal by laser.

Another method of forming the electrodes on the first face is by depositing a continuous conductive coating 26 on the non conductive dimensionally stable dielectric substrate 9 on at least one adjoining side to the face. Patterning of a first photoresist layer then occurs on at least a first face of the nonconductive dimensionally stable dielectric substrate 9 and finally etching results in a formed electrode. Patterning is done by either photoresist or direct removal by laser. A step of removing the first photoresist layer can occur after the step of etching the assemblage.

Patterning of the photoresist layer additionally occurs on the charging face of the non conductive dimensionally stable dielectric substrate 9. The non conductive dimensionally stable substrate has a first edge 17 between the first face 10 and a charging face 12. A non patterned conductive region 34 is formed between the first space 31 and the first edge 17.

The method next entails depositing a continuous conductive coating 26 on the charging face 12. The coating typically has a thickness between 1,000 Angstroms and 30,000 Angstroms. The coating forms a first electrode extension 40 and second electrode extension 41 on the charging face 12. The first electrode extension 40 engages the first electrode 27. The second electrode extension 40 engages the second electrode 28. Removing a portion of the continuous conductive coating 26 deposited on the charging face 12 forms a first space 31 on the charging face 12 between the two electrode extensions. The first electrode extension 40 is electrically isolated from the second electrode extension 41. The method ends by removing a portion of the first electrode 27 and the second electrode 28 to extend the first space 31 to form a continuous connected space 26 with the first space 31 on the charging face 12 forming a charge plate 39.

With reference to the figures, FIG. 1 depicts a top view of the charge plate 39 with a first electrode 27 and a second electrode 28 on a first face 10 of the substrate. The dimensionally stable dielectric substrate 9 has a continuous conductive coating 26. A first space 31 is created between the first electrode 27 and second electrode 28 by removing, by ablating, a portion of the continuous conductive coating 26. Additional electrodes 28, 29, and 30 are formed with additional spaces 32 and 33 are shown in FIG. 1. The additional electrodes 28, 29, and 30 are formed by ablating or otherwise removing portions of the continuous conductive coating 26 from the substrate.

The first face 10 has a first edge 17. The first edge 17 is preferably a sharp edge sharp, or when coated with the continuous conductive coating 26, can be beveled. If the first edge 17 is beveled, the first edge 17 typically has a radius of less than 50 microns.

FIG. 1 further depicts a non-patterned conductive region 34 formed between the first space 31 and the first edge 17. The first space 31 extends from the first edge 17 to all additional electrodes formed on the first face 10.

Figure 2:
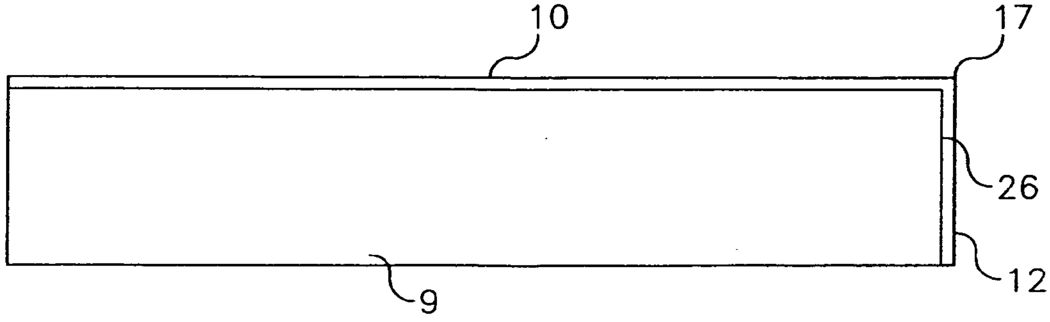
FIG. 2 depicts a cross section of the substrate of FIG. 1 with the conductive coating disposed on the charging face.

FIG. 2 examples a cross sectional view of the dimensionally stable dielectric substrate 9 with a continuous conductive coating 26. The continuous conductive coating 26 can be a single metal, a first metal on another metal, a conductive layer of a material other than metal or metal alloy, or two or more different conductive layers. The first edge 17 is shown between the first face 10 and a charging face 12. Titanium can be used as a metal with the dual layer conductive coating embodiment. Gold, platinum, palladium, silver, nickel, tantalum, tungsten alloys, or combinations thereof can also be used.

Figure 3:
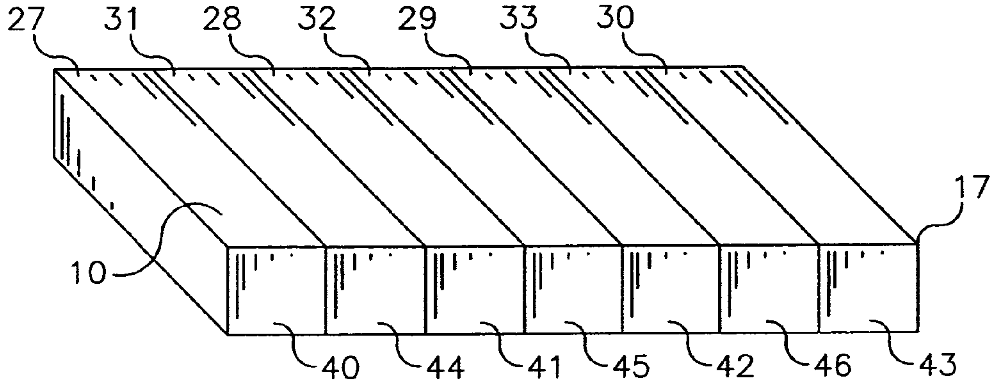
FIG. 3 depicts an isometric view of a substrate with electrodes formed on the first face and the charging face along with the corresponding spaces and gaps.

FIG. 3 depicts a side view showing the electrodes and electrode extensions that form the charging plate 39 according to the embodied methods. A first electrode 27 and second electrode 28 are formed on the-top face 10 of the substrate with a first space 31 is formed between the electrodes. In the embodiment depicted in FIG. 3, the electrodes extend all the way to first edge 17. The first electrode extension 40 on the charging face 12 engages the first electrode 27 and the second electrode extension 41 engages the second electrode 28. Similarly, FIG. 3 shows that third electrode 29 engages third electrode extension 42 and the fourth electrode 30 engages fourth electrode extension 43. Any number of electrodes and connected electrode extensions can be formed by these methods.

The spaces formed between the electrodes can be created by removing conductive coating material from the substrate.

Any known method of removing portions of the electrodes or portions of the conductive coating material from a substrate can be used, but ablation is the preferred technique. Ablation can be performed using a laser or an electron beam. Ablation can form the spaces, not only between the electrodes on the first side 10, but on the charging face 12 between the electrode extensions.

Continuing with FIG. 3, the first electrode extension 40 is electrically isolated from the second electrode extension 41 with a first space 31 on the charging face 44. The third electrode extension 42 is similarly separated from the second electrode extension 41 by a second space 32 on the charging face 45. The third electrode extension 42 is separated from the fourth electrode extension 43 by another third space 33 on the charging face 46.

Figure 4:
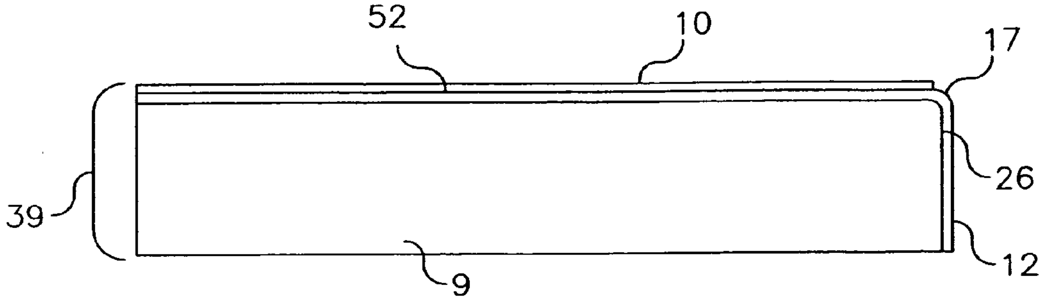
FIG. 4 depicts a detailed cross section of a second embodiment.

FIG. 4 shows the dimensionally stable dielectric substrate 9 with the continuous conductive coating 26 to form the charging plate 39. The top side 10 has a protective dielectric coating 52 disposed over the conductive coating, while the protective dielectric coating 52 does not cover the coating used to form the charging face 12. The protective dielectric material 52 can be an epoxy, such as Epotek 353ND from Epotek Technology of Billerica, Mass.; a polyimide, such as Kapton™ from DuPont of Wilmington, Del.; a thick film, such as the 5704 dielectric film from DuPont of Wilmington, Del.; or a thin film, such as silicon nitride, silicon carbide, aluminum oxide, or parylene from Union Carbide of Danbury, Conn. The protective dielectric material 52 can be a combination of these materials. The protective dielectric material 52 can be deposited by screen printing, vapor deposition, chemical deposition, sputtering, or combinations of these techniques.

Figure 5:
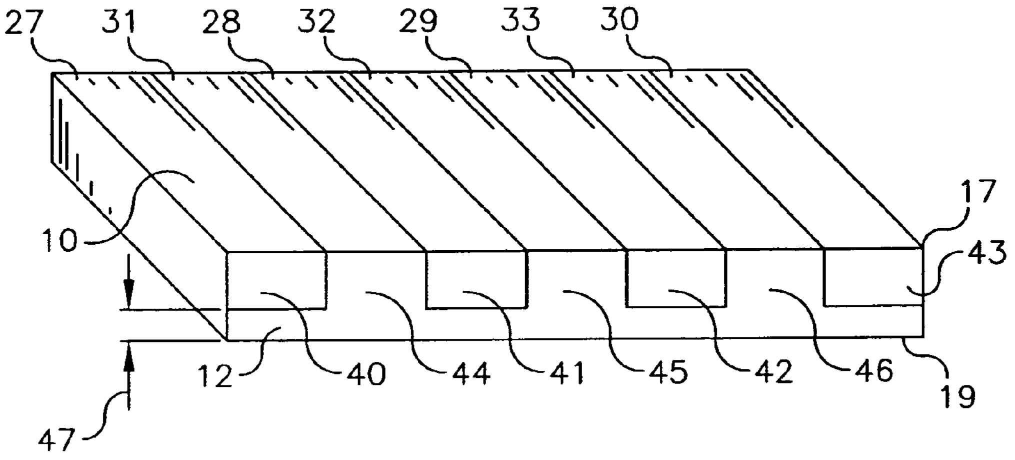
FIG. 5 depicts a perspective view of a substrate with the electrodes formed by patterning and depositing or by depositing and patterning.

FIG. 5 depicts an isometric top view of the electrode extensions overlaying the edge 17 onto the charging face 12, wherein the charging face 12 has a second gap 47 between the electrode extensions. FIG. 5 shows the gaps between the electrode extensions and a third edge 19.

Figure 6:
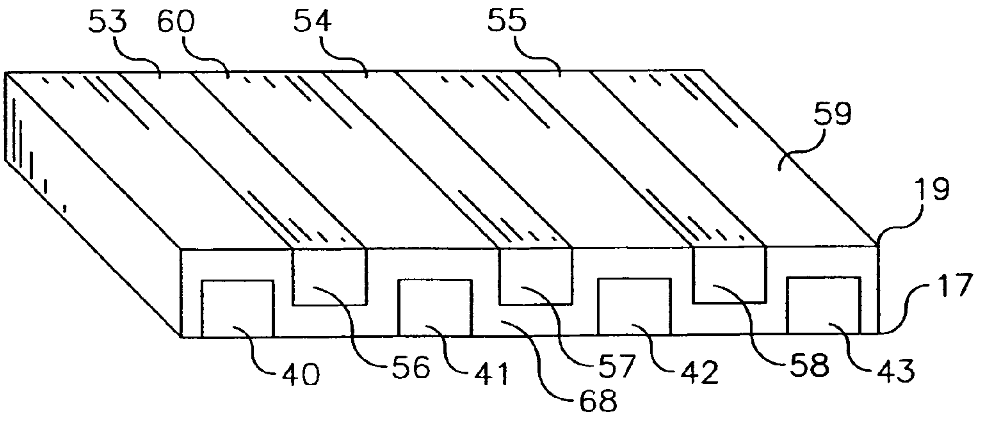
FIG. 6 depicts an isometric view of the third side of the charging plate.

FIG. 6 depicts an isometric bottom view of an embodiment of the charging plate 39. In the embodiment depicted in FIG. 6, the device includes a first third face electrode 53 and a second third face electrode 54 formed on a third face 59. A fourth space 60 is between the first third face electrode 53 and the second third face electrode 54. A non-patterned conductive region 34 is between the fourth space 60 and the third edge 19. Additional electrodes are formed by removing portions of the conductive coating as described the embodied methods. A first third face electrode extension 56 is formed, wherein the first third face electrode extension 56 engages the first third face electrode 53. A second third face electrode extension 57 engages the second third face electrode 54. A third third face electrode extension 58 engages the third third face electrode 55. A fifth space 68 on the charging face 12 is between the second third face electrode 54 and second third face electrode extension 57. The first third face electrode extension 57 is electrically isolated from the second third face electrode extension 54. A fourth space 60 forms a continuous connected space with the fifth space 68 on the charging face.

The electrodes of the top face and the third face 59 can have an alternative arrangement so that the corresponding electrode extensions alternate on the charging face. In another embodiment, the electrodes and corresponding electrode extensions can be grouped in alternating groups of electrodes, such as three electrodes and electrode extensions on the charging face from the top side and the three electrodes and electrode extensions onto the charging face form the third side.

The embodiments have been described in detail with particular reference to certain preferred embodiments thereof, but it will be understood that variations and modifications can be effected within the scope of the embodiments, especially to those skilled in the art.

PARTS LIST

9 dimensionally stable dielectric substrate
10 first face
12 charging face
17 first edge
19 third edge
26 continuous conductive coating
27 first electrode
28 second electrode
29 third electrode
30 fourth electrode
31 first space
32 second space
33 third space
34 non patterned conductive region
39 charge plate
40 first electrode extension
41 second electrode extension
42 third electrode extension
43 fourth electrode extension
44 first space on the charging face
45 second space on the charging face
46 third space on the charging face
47 second gap
52 protective dielectric material
53 first third face electrode
53 second third face electrode
55 third third face electrode
56 first third face electrode extension
57 second third face electrode extension
58 third third face electrode extension
59 third face
60 fourth space
68 fifth space

The invention claimed is:

1. A method for fabricating a charge plate for an ink jet printhead, wherein the method comprises the steps of:

a. forming an first electrode and a second electrode on a first face with a first space between the first electrode and second electrode on a non conductive dimensionally stable substrate, wherein the non conductive dimensionally stable substrate comprises a first edge between the first face and a charging face, and wherein a non patterned conductive region is formed between the first space and the first edge;

b. depositing a continuous conductive coating comprising a thickness between 1,000 Angstroms and 30,000 Angstroms on the charging face;

c. forming on the charging face a first electrode extension which engages the first electrode and a second electrode extension which engages the second electrode by removing a portion of the continuous conductive coating deposited on the charging face to form a first space on the charging face between the two electrode extensions, and wherein the first electrode extension is electrically isolated from the second electrode extension; and d. removing a portion of the first electrode and the second electrode to extend the first space to form a continuous connected space with first space on the charging face.

2. The method of claim 1, wherein the step of removing of portions of the electrodes and the continuous conductive coating is by ablation.

3. The method of claim 2, wherein the ablation is by using a laser or an electron beam.

4. The method of claim 1, further comprising the step of forming at least one additional space, at least one additional electrode is formed on the first face.

5. The method of claim 1, further forming on the charging face at least one additional electrode extension which engages at least one additional electrode.

6. The method of claim 5, further removing a portion of the additional electrode to form an additional continuous connected space on the charging face.

7. The method of claim 1, wherein the ink jet print head is a continuous ink jet printhead.

8. The method of claim 1, wherein the step of forming the first electrode and second electrode on the first face is by:
- e. patterning a first photoresist layer comprising a uniform thickness between 10,000 Angstroms and 40,000 Angstroms on at least a first face of the non conductive dimensionally stable dielectric substrate;
- f. depositing a continuous conductive coating comprising a thickness between 1,000 Angstroms and 30,000 Angstroms on at least one face of the charging face of a non conductive dimensionally stable dielectric substrate; and
- g. lifting off the first photoresist layer to form the electrode.

9. The method of claim 8, wherein the patterning is by photoresist or direct removal by laser.

10. The method of claim 1, wherein the step of forming of the first electrode and second electrode on the first face is by:
- h. depositing a continuous conductive coating comprising a thickness between 1,000 Angstroms and 30,000 Angstroms on the non conductive dimensionally stable substrate on at least one adjoining side to the face;
- i. patterning a first photoresist layer comprising a uniform thickness between 10,000 Angstroms and 40,000 Angstroms on at least a first face of the non conductive dimensionally stable substrate; and
- j. etching the resulting assemblage to form an electrode.

11. The method of claim 10, wherein the step of patterning is by photoresist or by direct removal by laser.

12. The method of claim 10, further comprising the step of removing the first photoresist layer after the step of etching the resulting assemblage.

13. The method of claim 1, further comprising the step of patterning the photoresist layer additionally on a charging face of the non conductive dimensionally stable substrate.

14. The method of claim 1, further comprises the step of depositing the continuous conductive coating on at least the first face and charging face of the non conductive dimensionally stable substrate.

15. The method of claim 1, wherein the step of using the continuous conductive coating to encapsulate the non conductive dimensionally stable substrate.

16. The method of claim 1, wherein the non conductive dimensionally stable substrate is a thin rectangular shape.

17. The method of claim 1, wherein the non conductive dimensionally stable substrate is slightly longer than a jet array for the ink jet printhead.

18. The method of claim 1, wherein the non conductive dimensionally stable substrate comprises a width between 1 inch and 6 inches, a length between ¼ inches and 30 inches, and a thickness between 0.004 inch and 0.4 inch.

19. The method of claim 1, wherein the non conductive dimensionally stable substrate is selected from the group consisting of ceramic, glass, quartz, and composites thereof, and combinations thereof.

20. The method of claim 1, wherein the continuous conductive coating comprises at least a second conductive coating deposited over a first conductive coating.

21. The method of claim 1, wherein the continuous conductive coating is between 1,000 Angstroms and 10,000 Angstroms.

22. The method of claim 1, wherein the continuous conductive coating is selected from the group consisting of titanium, gold, platinum, palladium, silver, nickel, tantalum, tungsten alloys thereof, and combinations thereof.

23. The method of claim 1, wherein step of the depositing of the continuous conductive coating is by a technique selected from the group consisting of chemical vapor deposition, evaporation, sputtering, electron beam evaporation, printing, electroless plating, thick film deposition, thin film deposition, and combinations thereof.

24. The method of claim 1, wherein in the step of forming the first electrode extension and second electrode extension on the charging face further comprises the step of forming a second gap between the first and second electrode extensions and a third edge.

25. The method of claim 1, further comprising the step of coating the charge plate with a protective dielectric material.

26. The method of claim 25, wherein the protective dielectric material is selected from the group consisting of an epoxy, a polyimide, a thick film, a thin film, and combinations thereof.

27. The method of claim 25, wherein the protective dielectric material can be deposited by screen printing, vapor deposition, chemical deposition, sputtering, or combinations thereof.

28. The method of claim 1, wherein the first edge is bevel.

29. The method of claim 28, wherein the first edge comprises a radius of less than 50 microns.

30. The method of claim 1, further comprising the step of
- k. forming a first third face electrode and a second third face electrode on a third face with a fourth space between the first third face electrode and the second third face electrode on the dimensionally stable dielectric substrate;
- l. forming a third edge between the third face and the charging face, and wherein a non patterned conductive region is formed between the fourth space and the third edge;
- m. depositing a continuous conductive coating comprising a thickness between 1,000 Angstroms and 30,000 Angstroms on the charging face;
- n. forming on the charging face on the first third face electrode extension that engages the first third face electrode and a second third face electrode extension that engages the second third face electrode by removing a portion of the continuous conductive coating deposited on the charging face to form a fifth space on the charging face between the two third face electrode extensions, and wherein the first third face electrode extension is electrically isolated from the second third face electrode extension; and
- o. removing a portion of the first third face electrode and the second third face electrode to extend the fourth space to form a continuous connected space with fifth space on the charging face.

* * * * *